United States Patent [19]

Androff

[11] 4,348,871

[45] Sep. 14, 1982

[54] TRANSPORT REFRIGERATION MACHINE

[75] Inventor: Joel W. Androff, Rowland Heights, Calif.

[73] Assignee: Carrier Corporation, Syracuse, N.Y.

[21] Appl. No.: 238,389

[22] Filed: Feb. 24, 1981

[51] Int. Cl.³ .............................................. F25D 23/12
[52] U.S. Cl. ........................................ 62/239; 62/263
[58] Field of Search .......................... 62/239, 244, 263

[56] References Cited

U.S. PATENT DOCUMENTS

| | | | |
|---|---|---|---|
| 2,630,687 | 3/1953 | Acton | 62/239 |
| 3,871,188 | 3/1975 | Vold et al. | 62/263 |
| 4,132,088 | 1/1979 | Grosskopf | 62/239 X |
| 4,182,134 | 1/1980 | Viegas | 62/263 |

Primary Examiner—Lloyd L. King
Attorney, Agent, or Firm—J. Raymond Curtin; John S. Sensny

[57] ABSTRACT

A transport refrigeration machine for conditioning the interior of a trailer comprising a refrigerant compressor, a condenser assembly including a condenser fan, and an evaporator assembly including an evaporator fan. The machine further comprises a fan shaft for driving the condenser and evaporator fans, an engine for driving the compressor and the fan shaft, and a frame supporting the refrigeration machine. The frame includes a box sub-frame, a condenser assembly support sub-frame, an evaporator assembly support sub-frame, and a shaft support sub-frame rotatably supporting the fan shaft.

4 Claims, 11 Drawing Figures

TRANSPORT REFRIGERATION MACHINE

BACKGROUND OF THE INVENTION

This invention generally relates to refrigeration machines, and more specifically to transport refrigeration machines for conditioning the interior of truck trailer units.

As is well understood in the art, transport refrigeration machines are often secured to a forward wall of a truck trailer unit to cool the interior thereof. Among other favorable considerations, it is usually desirable to minimize the extent to which the refrigeration machines protrudes into the cargo area of the trailer since such protrusion reduces the effective cargo capacity of the trailer. Minimizing or eliminating this protrusion, however, is complicated by a number of factors. Principally, as a practical matter, the extent to which the refrigeration machine as a whole can extend forward of the trailer is limited, for example, by other equipment on or parts of the truck trailer unit, and by the need to allow room forward of the trailer for the truck cab to pivot toward the trailer as the truck turns.

Second, even with many prior art machines which protrude into the trailer cargo space, many of the machine parts are very closely fitted together, and it is practically impossible to eliminate the protrusion of the machine into the trailer cargo space by simply moving the machine elements closer together. Furthermore, typically, many of the parts of transport refrigeration machines are structurally interrelated, for example many components support adjacent elements. It is difficult, and may be practically impossible, to significantly alter the size, shape, strength, or position of a part if that part is used to support a different element.

SUMMARY OF THE INVENTION

In view of the above, an object of the present invention is to improve transport refrigeration machines.

Another object of this invention is to eliminate completely the protrusion of a transport refrigeration machine into the cargo space of a truck trailer unit.

A further object of the present invention is to move the evaporator assembly forward within a transport refrigeration machine.

Still another object of this invention is to provide a transport refrigeration machine with a unique and relatively simple frame which supports the fan shaft of the machine via a front portion of the frame.

These and other objectives are attained with a transport refrigeration machine for conditioning the interior of a trailer. The machine comprises a refrigerant compressor, a condenser assembly including a condenser fan, and an evaporator assembly located rearward of the condenser assembly and including an evaporator fan. The refrigeration machine further comprises shaft means for driving the condenser and evaporator fans, power means for driving the compressor and the shaft means, and a frame supporting the refrigeration machine and for connecting the machine to the trailer. The frame, in turn, includes a box sub-frame, a condenser assembly support sub-frame supported by the box sub-frame and supporting the condenser assembly, an evaporator assembly support sub-frame supported by the box sub-frame and supporting the evaporator assembly, and a shaft support sub-frame secured to the condenser assembly support sub-frame, projecting rearward therefrom, and rotatably supporting the shaft means rearward of the condenser assembly and forward of the evaporator assembly.

A BRIEF DESCRIPTION OF THE DRAWINGS

Figure 2:
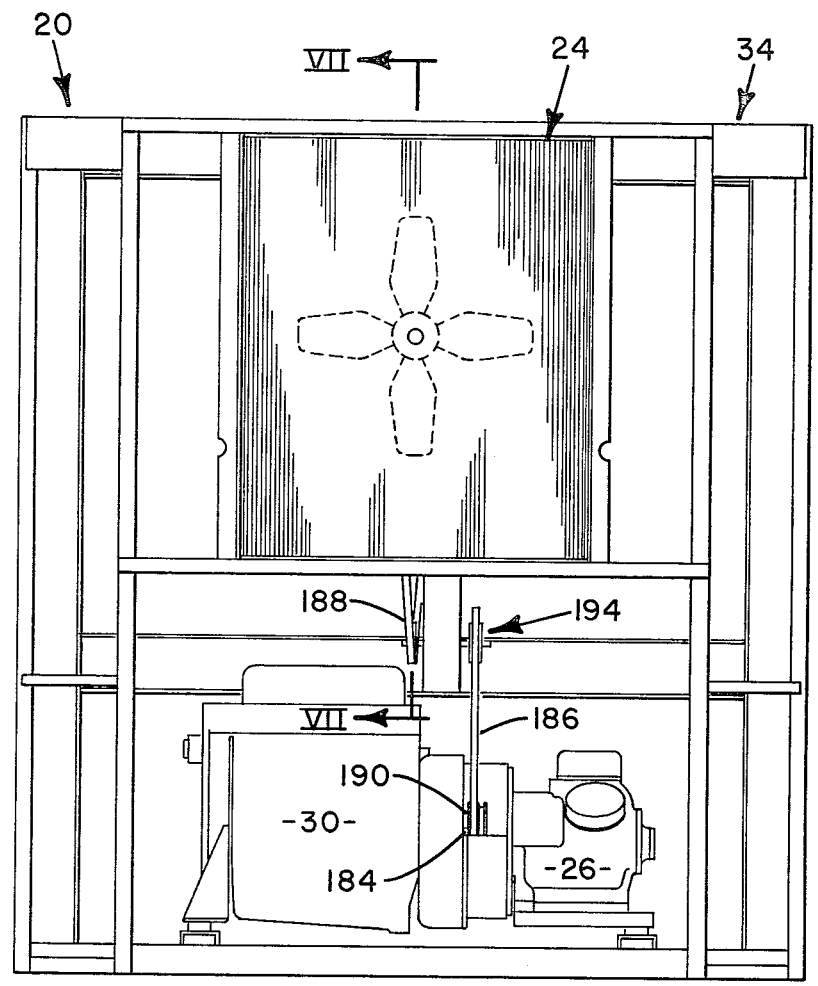
FIG. 2 is a front outline view of the refrigeration machine, with the cover and other parts of the machine omitted for clarity.
Figure 3:
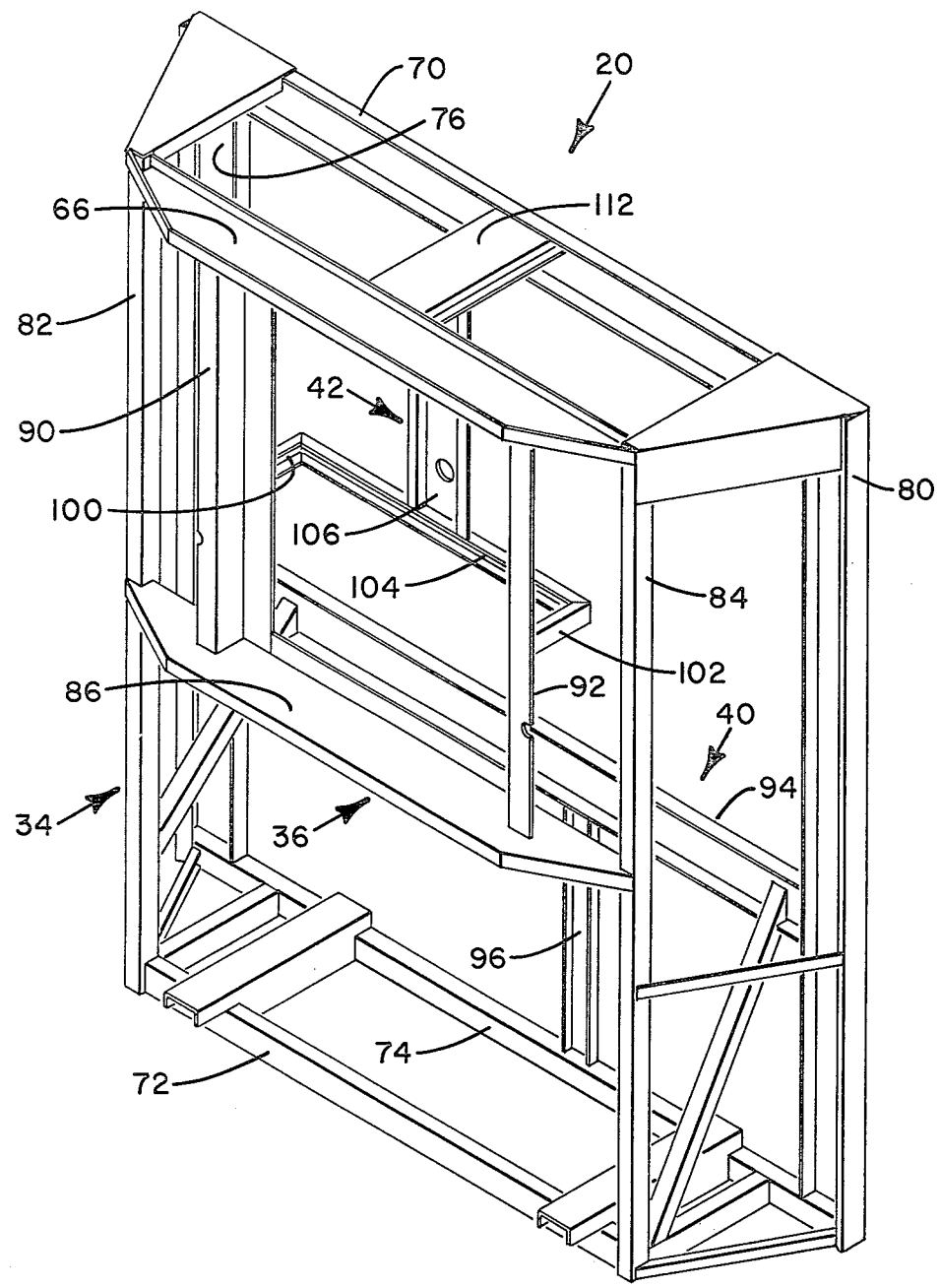
FIG. 3 is a front perspective of the frame of the refrigeration machine.
Figure 5:
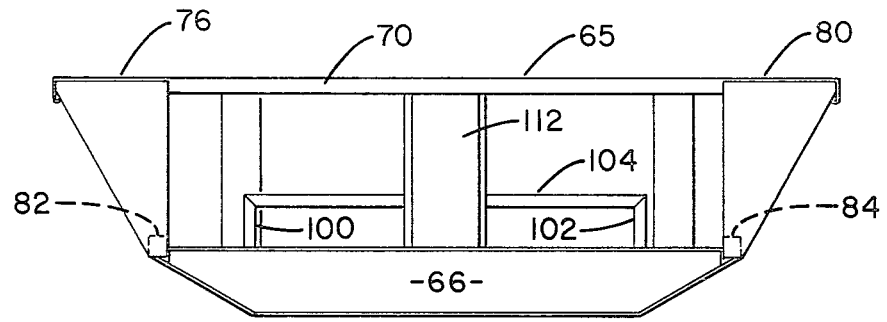
Figure 4:
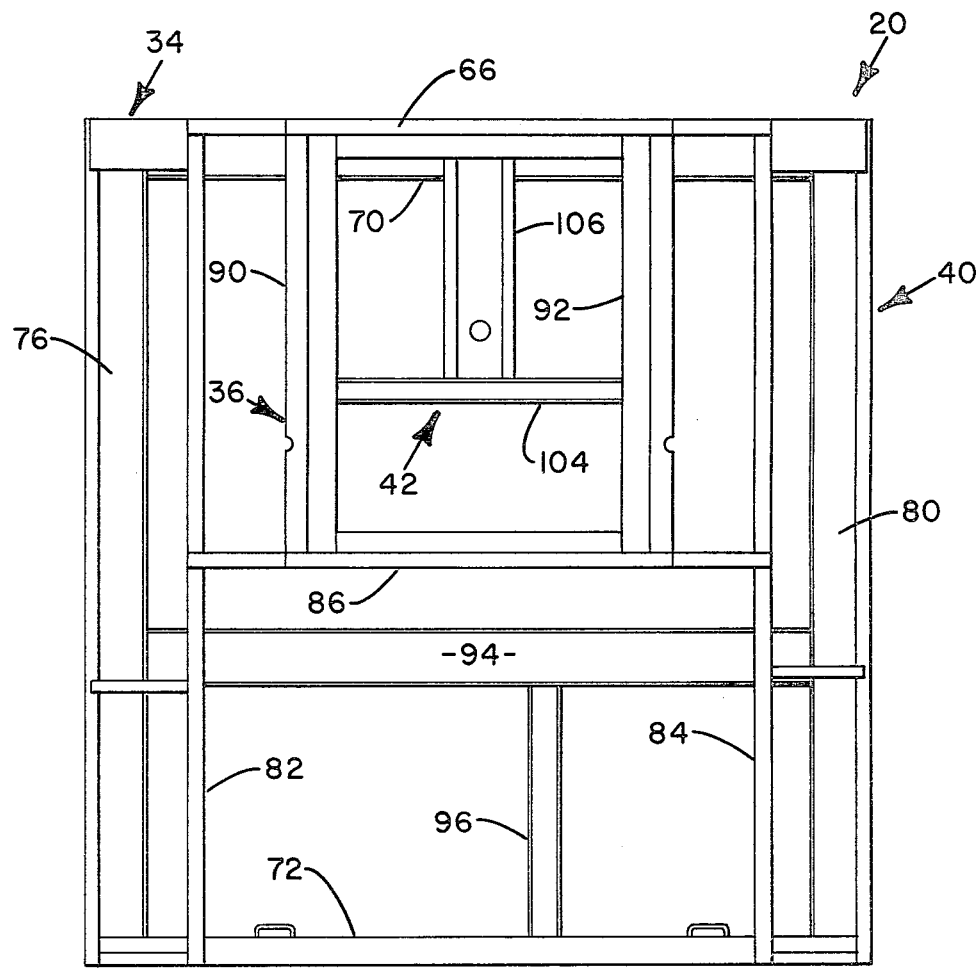
Figure 6:
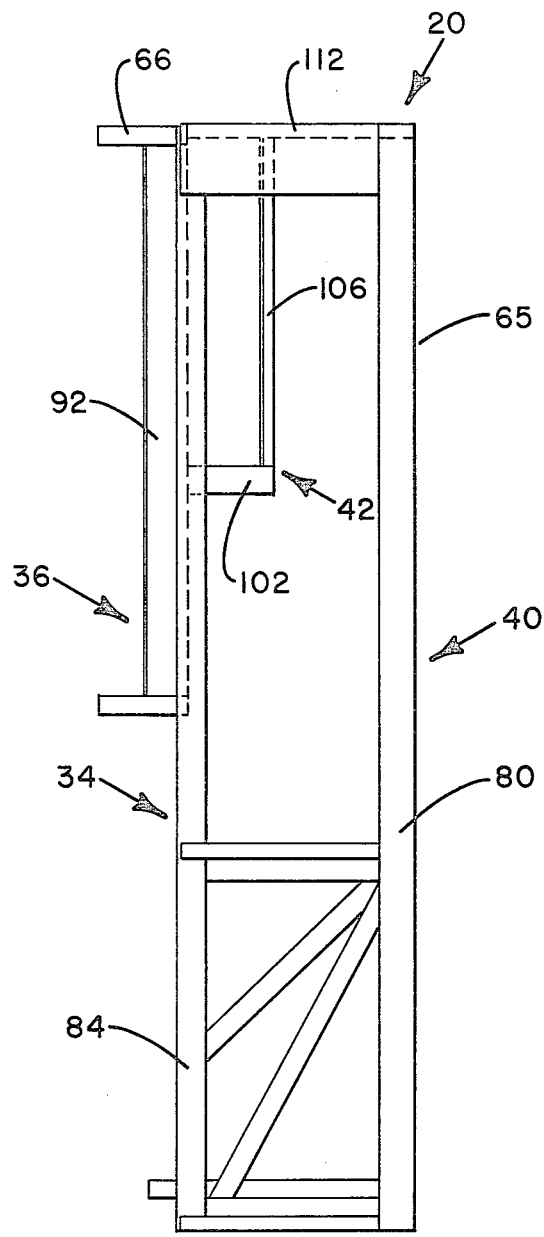
Figure 7:
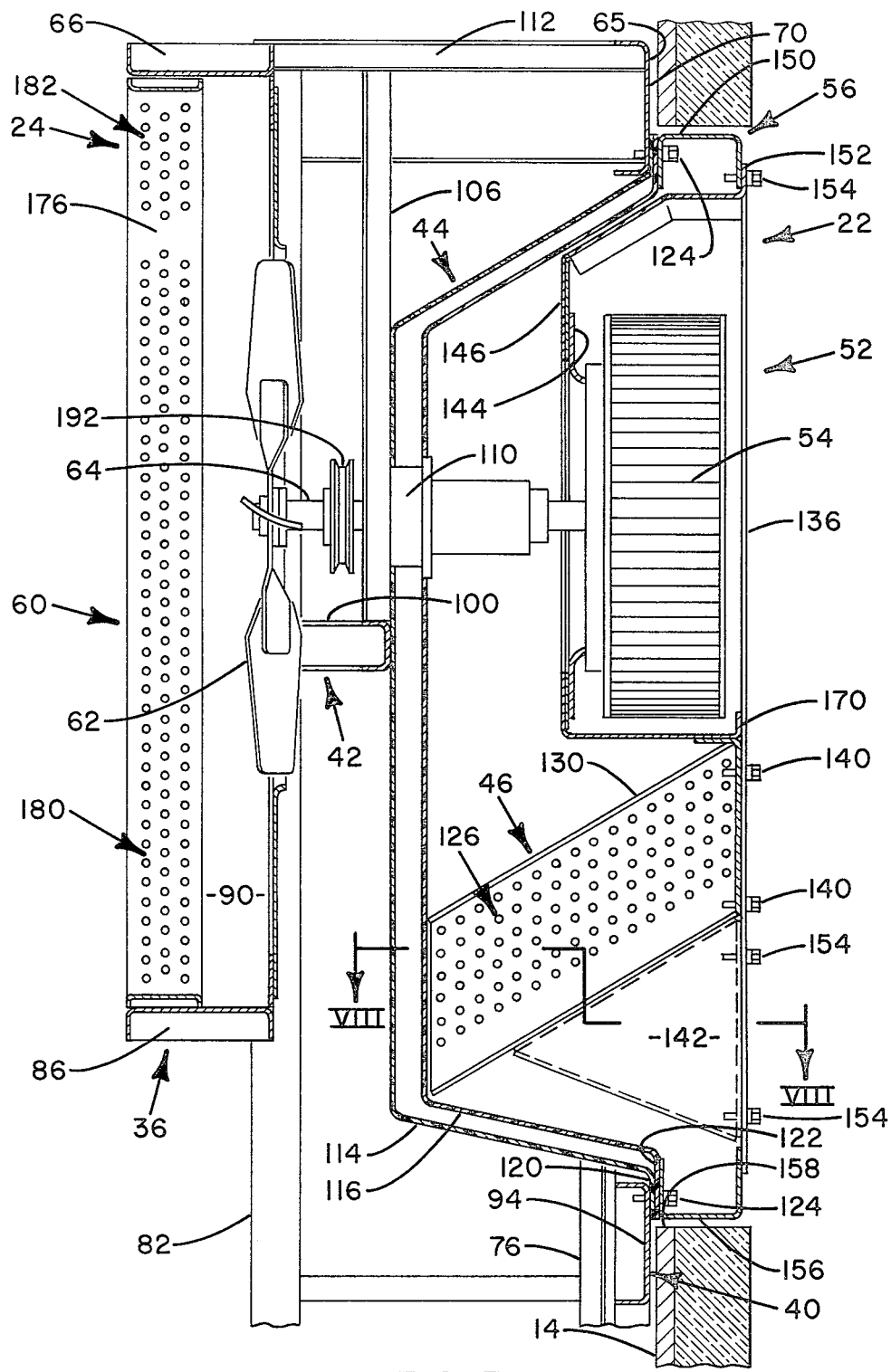
Figure 8:
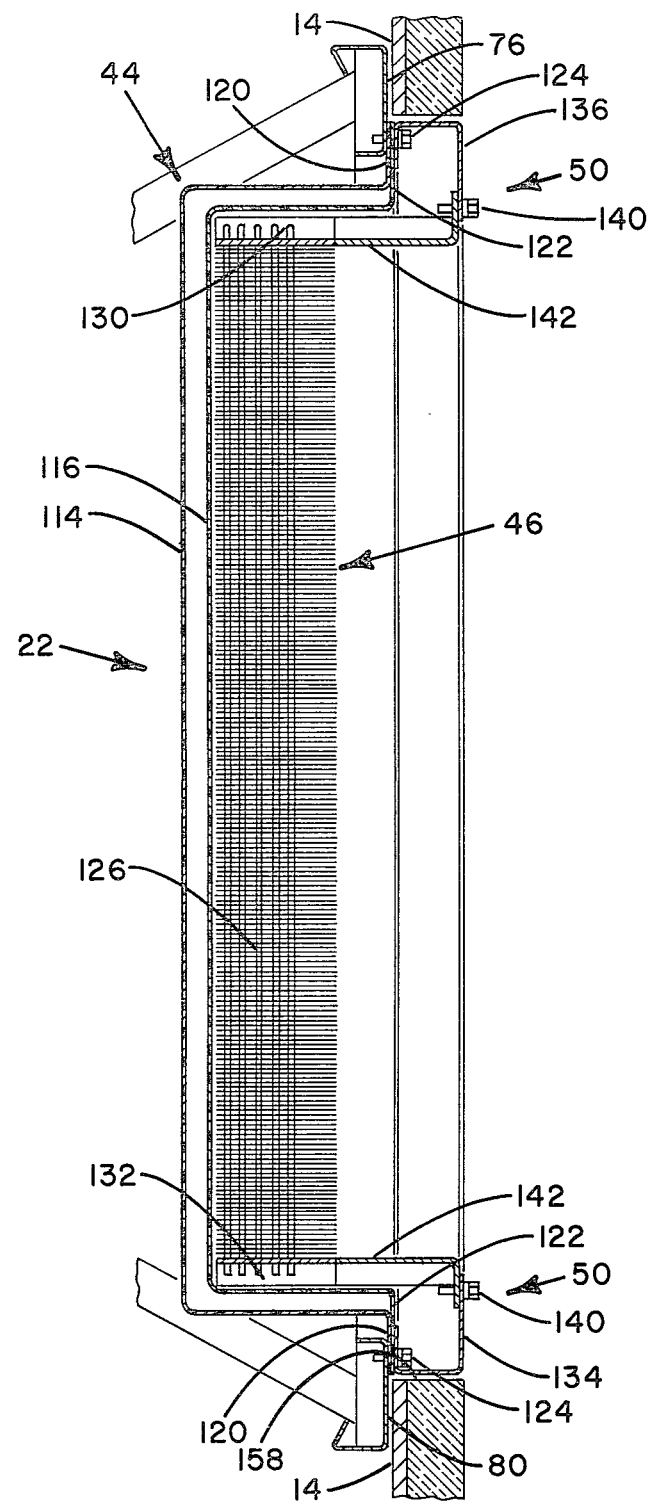
Figure 9:
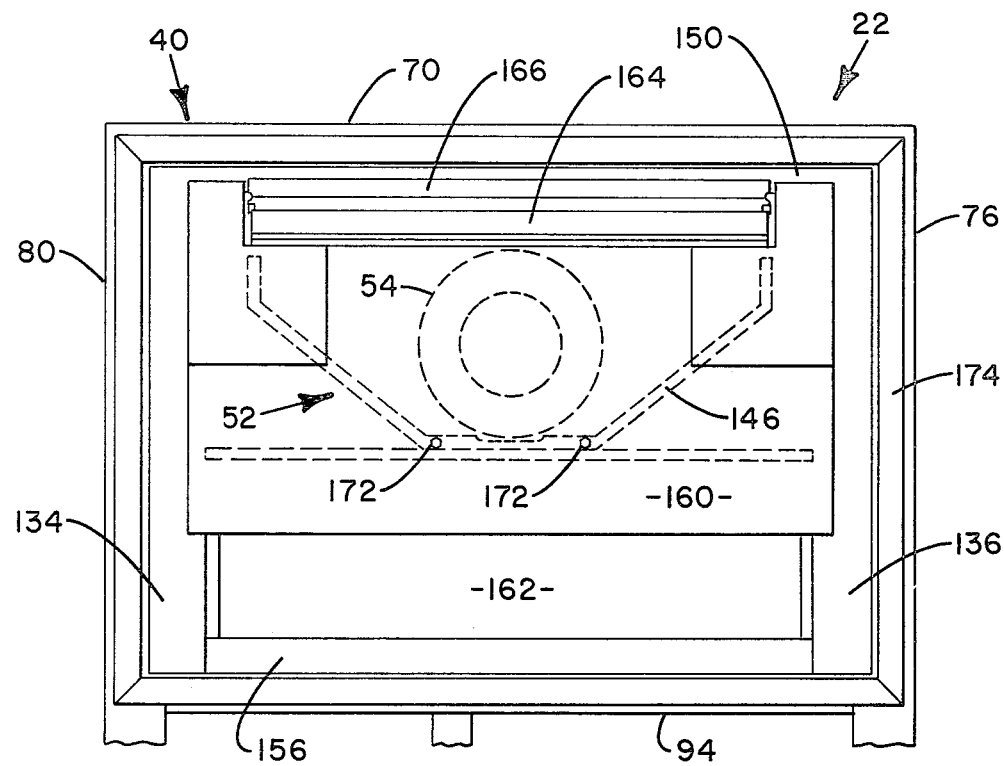
Figure 11:
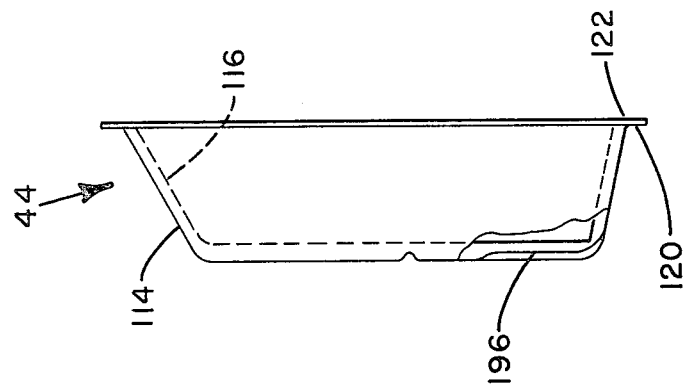
Figure 10:
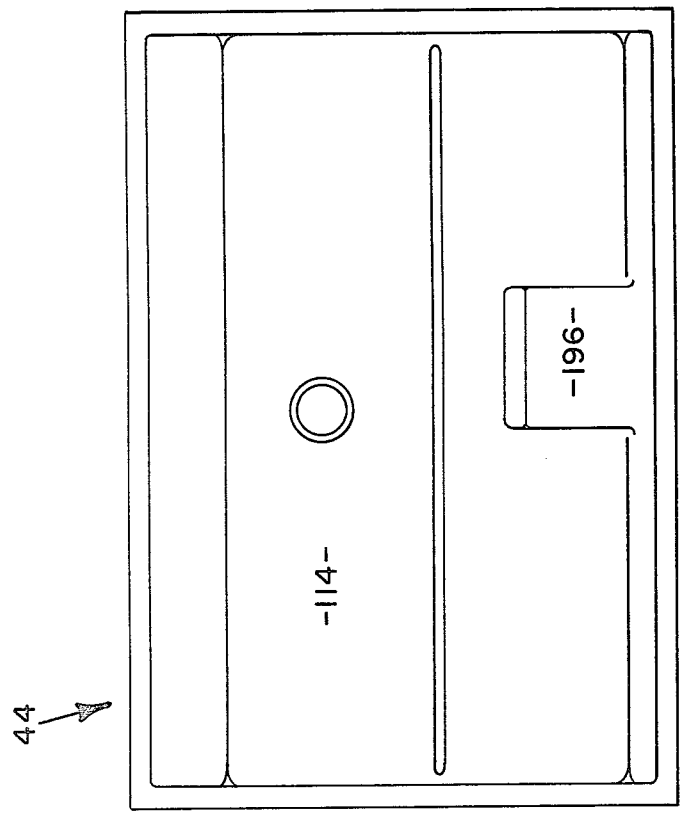

FIGS. 4, 5, and 6 are front, top, and side views respectively illustrating the frame shown in FIG. 3;

FIG. 7 is a side view, partly in cross section, showing portions of the condenser assembly, the evaporator assembly, and the frame of the refrigeration machine, with the cross sectional portions of the view taken along line VII—VII of FIG. 2;

FIG. 8 is a horizontal cross sectional view of the evaporator assembly, taken along line VIII—VIII of FIG. 7;

FIG. 9 is a rear view showing the evaporator assembly of the refrigeration machine in greater detail; and FIGS. 10 and 11 are front and side views respectively of the evaporator housing of the evaporator assembly.

A DETAILED DESCRIPTION OF THE PREFERRED EMBODIMENT

The various figures in the drawings illustrate transport refrigeration machine 10 incorporating teachings of the present invention. Also shown in the drawings are portions of truck trailer unit 12, specifically portions of front wall 14 thereof. Particularly referring first to FIGS. 1, 2, 7, and 8, machine 10 generally comprises frame 20, evaporator assembly 22, condenser assembly 24, compressor 26, power means such as engine 30, and cover 32.

More specifically, frame 20 includes box sub-frame 34, condenser assembly support sub-frame 36, evaporator assembly support sub-frame 40, and fan shaft support sub-frame 42. Evaporator assembly 22 includes housing 44, heat exchanger 46, and heat exchanger support means 50. Evaporator assembly 22 further comprises blower unit 52, including evaporator fan 54, and blower unit support means 56. Condenser assembly 24 generally includes heat exchanger 60 and condenser fan 62. It should be noted that fans 54 and 62 are secured to and driven by common fan shaft 64.

Discussing frame 20 in even greater detail, the frame supports refrigeration machine 10 and is adapted for securing the machine to trailer 12, specifically front wall 14 thereof. Also, frame 20 defines a vertical, back plane 65 which, when the frame is connected to front wall 14 of trailer 12, extends adjacent and substantially parallel to the front wall of the trailer. Particularly referring now to FIGS. 3 through 6, box sub-frame 34 includes, inter alia, horizontally extending top front beam 66, top back beam 70, front base beam 72, and back base beam 74. Box sub-frame 34 further comprises a pair of vertically extending outside back beams 76 and 80, and a pair of vertically extending outside front posts 82 and 84, which are located forward of the outside back beams 76 and 80. The various elements comprising box sub-frame 34 are rigidly secured together, forming a strong outline for refrigeration machine 10.

Condenser assembly support sub-frame 36 includes top front beam 66, lower beam 86, and side beams 90 and 92. Lower beam 86 is secured to and horizontally extends between intermediate portions of opposed sides of box sub-frame 34, specifically posts 82 and 84 thereof, and side beams 90 and 92 are secured to and extend between upper and lower beams 66 and 86. Evaporator assembly support sub-frame 40 includes top back beam 70, outside beams 76 and 80, and lower back beam 94. Lower back beam 94 is secured to and extends between intermediate portions of outside beams 76 and 80. Brace 96 may be located between back base beam 74 and beam 94 to help support the latter beam.

Fan shaft support sub-frame 42 is secured to condenser assembly support sub-frame 36, projects rearward therefrom, and rotatably supports fan shaft 64 rearward of condenser assembly 24 and forward of evaporator assembly 22. With the preferred embodiment shown in the drawings, fan shaft support sub-frame 42 comprises first and second spaced arms 100 and 102, shoulder 104, shaft support member 106, bearing 110 (shown in FIG. 7), and reinforcing member 112. Arms 100 and 102 are secured to and rearwardly extend from condenser assembly support sub-frame 36, preferably side beams 90 and 92 thereof, and shoulder 104 is secured to and extends between arms 100 and 102. A lower end of shaft support member 106 is secured to shoulder 104, and the shaft support member projects upward therefrom, between evaporator assembly 22 and condenser assembly 24. Bearing 110 is rigidly secured to shaft support member 106 and, in a conventional manner, rotatably supports fan shaft 64, which extends through the bearing and through the shaft support member.

Reinforcing member 112 is secured to an upper end of shaft support member 106, extends forward therefrom, and has a front end secured to condenser assembly support sub-frame 36, specifically top beam 66 thereof, thus bracing the shaft support member within frame 20. In addition, reinforcing member 112 may also extends rearward from shaft support member 106 and a back end of the reinforcing member is secured to top back beam 70 of evaporator assembly support sub-frame 40 to further brace the shaft support member.

Particularly referring now to evaporator assembly 22, as is believed best illustrated in FIGS. 7 through 9, the evaporator assembly is located in the upper rear portion of refrigeration machine 10 and is supported by frame 20, specifically evaporator assembly support sub-frame 40. Evaporator housing 44 is secured to and supported by frame 20, and the housing includes outside and inside nested shells 114 and 116 which, for reasons discussed below, are preferably formed from a plastic such as Fiberglass. Shells 114 and 116 respectively include peripheral flanges 120 and 122, flange 120 is disposed rearward of and adjacent to beams 70, 76, 80, and 94, and flange 122 is disposed rearward of and adjacent to flange 120. Flanges 120 and 122 are secured to beams 70, 76, 80, and 94 in any suitable manner such as by bolts 124, thus securing housing 44 to frame 20. It should be noted that the main body of evaporator housing 44, that is, the portion of the housing forward of flanges 120 and 122, is completely forward of back plane 65 defined by frame 20. Further, front and side surfaces of shells 114 and 116 are slightly spaced apart, and this space is filled with thermally insulating material (not shown) to facilitate maintaining a temperature differential across housing 44.

Evaporator heat exchanger 46 extends within housing 44 and is provided for conducting a refrigerant fluid therethrough. Heat exchanger 46 includes refrigerant coil 126 and end plates 130 and 132, with coil 126 supported by and transversely extending between these end plates. Preferably, heat exchanger 46 is of the conventional fin-tube type, and a plurality of heat transfer fins extend across coil 126 generally parallel to end plates 130 and 132; but heat exchanger 46 has a rhomboidal shape, sloping upward and rearward within evaporator assembly 22.

Heat exchanger support means 50 connects heat exchanger 46 to frame 20 to support the heat exchanger independently of housing 44. Heat exchanger support means 50 includes first and second side channel members 134 and 136 and securing means 140. Channel members 134 and 136 are secured to frame 20, specifically outside beams 76 and 80, and the channel members project rearward of housing 44. Securing means 140, which may be any suitable type such as bolts, are utilized to secure heat exchanger 46, specifically end plates 130 and 132 thereof, to channel members 134 and 136.

Preferably, channel members 134 and 136 have a generally U-shaped transverse cross section, and inside surfaces of the channel members are disposed rearward of and secured to outside beams 76 and 80 via bolts 124. Intermediate surfaces of channel members 134 and 136 extend rearwardly from the inside surfaces thereof; and outside surfaces of the channel members perpendicularly extend from the intermediate surfaces thereof, toward the rear, vertical centerline of evaporator assembly 22. Bolts 140 extend through the outside surfaces of channel members 134 and 136, into end plates 130 and 132, securely connecting heat exchanger 46 to the channel members. It should be noted that, even though evaporator housing flanges 120 and 122 are located between beams 76 and 80 and side channel members 134 and 136, and even though bolts 124, which secure the side channel members to beams 76 and 80, also secure flanges 120 and 122 to these side beams, housing flanges 120 and 122 are not needed to support the side channel members and evaporator heat exchanger 46.

As illustrated in the drawings, heat exchanger support means 50 further includes buttress members 142. Buttress members 142 are secured to and project forward from side channel members 134 and 136, and the buttress members extend directly below and in contact with end plates 130 and 132 to further support heat exchanger 46 within evaporator assembly 22. End plates 130 and 132 may be secured to buttress members 142, for example by bolts.

Blower unit 52 also extends within housing 44 and is provided for circulating air therethrough in heat transfer relation with the refrigerant conducted through heat exchanger 46. Blower unit 52 includes evaporator fan 54, fan inlet guide 144, and blower housing 146.

Blower housing 146 supports fan inlet guide 144 and generally guides the air flow through evaporator assembly 22, and the fan inlet guide directly conducts the air flow to fan 54. The front surface of blower housing 146 defines a blower inlet to place the interior of the blower housing and fan inlet guide 144 in direct communication with the space immediately forward of the blower housing.

Blower unit support means 56 connects blower unit 52 to frame 20 to support the blower unit independently of evaporator housing 44, and the blower unit support means includes top channel member 150, upper flange 152, and securing means 154. Channel member 150 is secured to frame 20, specifically beam 70, and the channel member projects rearward of evaporator housing 44. Upper flange 152, which preferably is an integral part of blower housing 146, is disposed rearward of and contiguous to top channel member 150. Securing means 154, which may be of any conventional type such as bolts, are employed to secure flange 152 to channel member 150.

Preferably, top channel member 150, similar to side channel members 134 and 136, has a generally U-shaped transverse cross section, with an inside surface disposed rearward of and secured to beam 70 and an intermediate surface extending rearward from the inside surface of the top channel member. An outside surface of channel member 150 perpendicularly extends downward from the intermediate surface thereof, and bolts 154 extend through blower unit flange 152 and into the outside surface of channel member 150, securely connecting blower unit 52 to the top channel member. Hereto it should be pointed out that, even though evaporator housing flanges 120 and 122 are located between beam 70 and top channel member 150, and even though the same bolts which secure the top channel member to beam 70 also secure the evaporator housing flanges thereto, housing flanges 120 and 122 are not necessary to support the top channel member and blower unit 52.

Preferably, evaporator assembly 22 includes a fourth, bottom channel member 156 secured to beam 94, extending rearward generally therefrom, and having a shape similar to the other channel members 134, 136, and 150. When refrigeration machine 10 is secured to front wall 14 of truck trailer 12, the four channel members 134, 136, 150, and 156 project into opening 158 defined by and extending through the front wall of the trailer, and the channel members themselves define a central opening to bring the interior of evaporator assembly 22 into communication with the interior of the trailer. It should be pointed out the insides of the walls of truck trailer 12, as is conventional with truck trailer units employing refrigeration machines, include insulating material; and channel members 134, 136, 150, and 156, which define the rearmost projection of refrigeration machine 10, do not project rearward of the insulating material forming the inside portion of front wall 14. Thus evaporator assembly 22 and the entire refrigeration machine 10 of this invention are located completely forward and external of the interior cargo space of trailer 12, maximizing the available cargo space therein.

Cover plates 160 (shown only in FIG. 9), preferably comprising a plurality of separable plates, are secured to and extend across side channel members 134 and 136, covering much of the space between all four channel members 134, 136, 150, and 156. Cover plates 160, side channel members 134 and 136, and bottom channel member 156 define inlet opening 162, however, to allow air to flow into evaporator assembly 22; and the cover plates and top channel member 156 define discharge opening 164 to allow air to exit the evaporator assembly. Inlet opening 162 may be covered by a protective grill (not shown), and discharge opening 164 may be provided with louvers 166 which, as is understood by those skilled in the art, may be closed to facilitate defrosting evaporator coil 126. In addition, blower housing 146 may be provided with lower flange 170 located contiguous to cover plates 160 and secured thereto by means such as bolts 172, thus further supporting blower unit 52 within evaporator assembly 22. Moreover, sealing gasket 174 may be disposed between frame 20 and front wall 14 of trailer 12, circumscribing evaporator assembly 22 and truck opening 158, to seal the interface between the frame and the trailer front wall.

Turning now to the other major components of refrigeration machine 10, condenser assembly 24 is located in the upper front portion of refrigeration machine 10 and is supported by frame 20, particularly condenser assembly support sub-frame 36. Condenser assembly heat exchanger 60 comprises spaced, parallel end plates 176 (only one is shown in the drawings), condenser coil 180, and radiator coil 182. End plates 176 are located inside beams 90 and 92 and are secured to and extend between beams 66 and 86. Coils 180 and 182, in turn, are secured to and transversely extend between end plates 176. Thus, in assembly, upper beam 66 horizontally extends above condenser assembly 24, lower beam 86 horizontally extends below the condenser assembly, and side beams 90 and 92 vertically extend outside the condenser assembly between beams 66 and 86. As will be understood, separate fluids are conducted through coils 180 and 182, with coil 180 acting as a refrigerant condenser and coil 182 functioning as a radiator for engine 30. Further, preferably condenser assembly heat exchanger 60 is of the conventional fin-tube type, with a plurality of heat transfer fins extending across coils 180 and 182 generally parallel to end plates 176.

Compressor 26 is located in the bottom portion of refrigeration machine 10 and is supported via base beams 72 and 74 of box sub-frame 34. As will be understood by those skilled in the art, compressor 26, evaporator coil 126, condenser coil 180, and a suitable expansion device (not shown) are connected together to form a closed loop vapor compression refrigeration circuit. This expansion device may be located in any suitable position, and commonly, for example, the expansion device is located within evaporator assembly 22 adjacent heat exchange coil 126.

Engine 30 also is located in the bottom portion of refrigeration machine 10 and is supported via base beams 72 and 74 of box sub-frame 34. Engine 30 is provided for driving compressor 26 and the engine is drivingly connected thereto by shaft 184. Engine 30 is also provided for driving fans 54 and 62 via fan shaft 64; and the engine is conventionally connected to the fan shaft by means of shaft 184, belts 186 and 188, pulleys 190 and 192, and intermediate pulley-shaft assembly 194. As will be apparent, evaporator housing 44, condenser assembly 24, fan shaft 64, fan shaft support sub-frame 42, belt 188, and intermediate shaft-pulley assembly 194 all fit relatively closely together within machine 10; and, as shown in FIGS. 10 and 11, the forward surface of outside shell 114 of the evaporator housing defines recess 196 to insure an adequate clearance between the evaporator housing and the intermediate pulley-shaft assembly.

Because evaporator housing 44 has this unique, irregular shape and to avoid the relatively large capital costs associated with a metal stamping process, preferably evaporator housing shells 114 and 116 are formed by a plastic molding process. Forming shells 114 and 116 from a plastic material instead of a metal also improves the desired thermal separation of the interior of housing 44 and of the entire evaporator assembly 22 from the other components of refrigeration machine 10. For example, since evaporator housing 44 is formed from a plastic, the housing itself is thermally insulated from frame 20 even though portions of the housing are in direct contact with the frame. In addition, with housing flanges 120 and 122 located between frame 20 and channel members 134, 136, 150, and 156, the flanges thermally insulate the channel members and, thus, heat exchanger support means 50 and blower unit support means 56 from the frame, substantially completely thermally isolating evaporator assembly 22 from frame 20.

Figure 1:
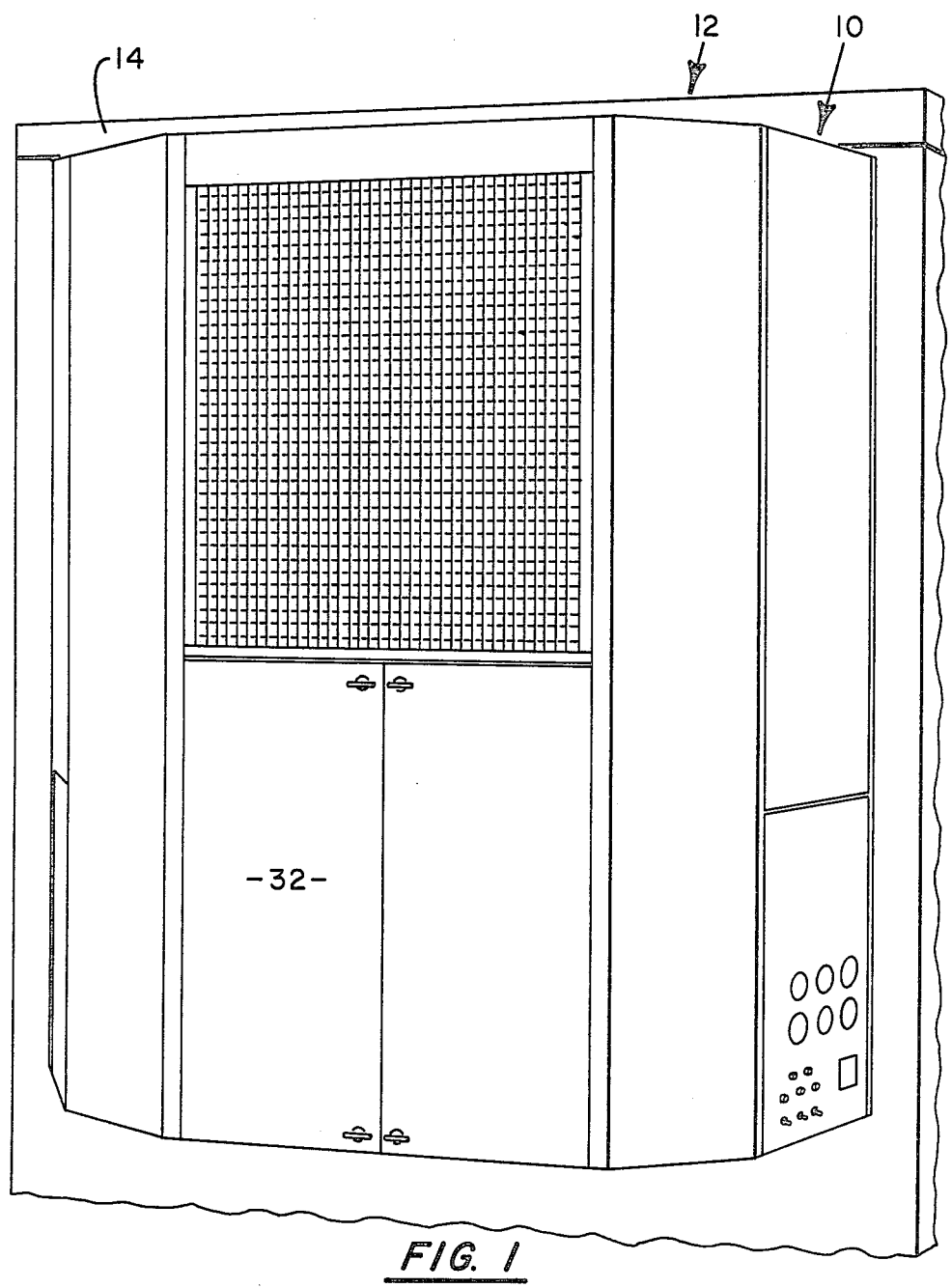
FIG. 1 is a front perspective view of a transport refrigeration machine incorporating teachings of the present invention.

Finally, cover 32, omitted in all views except FIG. 1, is secured to frame 20 to protect the interior elements of machine 10. Cover 32 may be removed relatively easy to provide access to the inside of refrigeration machine 10, and preferably the cover is provided with individual doors to allow access to various inside elements of machine 10 without requiring removal of the entire cover.

Thus, as may be appreciated from a review of the above discussion, transport refrigeration machine 10 of the present invention is a relatively simple yet very compact machine. Because fan shaft support sub-frame 42 is supported from condenser assembly support sub-frame 40 instead of, for example, evaporator assembly support sub-frame 40, the present invention effectively creates additional space within the rear portion of machine 10, allowing evaporator assembly 22 to be moved forward into this space and out of the cargo area of truck trailer 12. Moreover, because evaporator heat exchanger 46 and blower unit 52 are supported by frame 20 independent of evaporator housing 44, the housing may be formed from a lightweight plastic material. This, first, assists thermally insulating the interior of housing 44 from the rest of machine 10 and, second, facilitates forming various recesses and indentations in the housing. With these recesses and indentations, evaporator housing 44 and the entire evaporator assembly 22 may be very compactly fitted within machine 10, completely forward of the interior of trailer 12.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A transport refrigeration machine for conditioning the interior of a trailer, comprising:
   a refrigerant compressor;
   a condenser assembly including a condenser fan;
   an evaporator assembly located rearward of the condenser assembly and including an evaporator fan;
   shaft means for driving the condenser and evaporator fans;
   power means for driving the compressor and the shaft means;
   a frame supporting the refrigeration machine and for connecting the machine to the trailer, and including
   a box sub-frame including a pair of vertically extending outside back beams, a pair of vertically extending outside front posts located forward of the back beams, horizontally extending top and bottom back beams extending between the outside back beams, and horizontally extending top and bottom front beams extending between the outside front posts,
   a condenser assembly support sub-frame supported by and extending between the outside front posts of the box sub-frame and supporting the condenser assembly,
   an evaporator assembly support sub-frame supported by the box sub-frame and supporting the evaporator assembly, and
   a shaft support sub-frame secured to the condenser assembly support sub-frame, projecting rearward therefrom, and rotatably supporting the shaft means rearward of the condenser assembly and forward of the evaporator assembly.

2. A transport refrigeration machine as defined by claim 1 wherein the shaft support sub-frame includes:
   first and second, spaced arms secured to and rearwardly extending from the condenser assembly support sub-frame;
   a shoulder secured to and extending between the first and second arms;
   a shaft support member having a lower end secured to the shoulder, projecting upward therefrom between the evaporator and condenser assemblies, and rotatably supporting the shaft means; and
   a reinforcing member secured to an upper end of the shaft support member, extending forward therefrom, and having a front end secured to the condenser assembly support sub-frame to brace the shaft support member.

3. A transport refrigeration machine as defined by claim 2 wherein:
   the condenser assembly support sub-frame includes the top front beam of the box sub-frame, a lower beam horizontally extending below the condenser assembly and between the outside front posts of the box sub-frame, and
   first and second side beams located outside the condenser assembly, and secured to and extending between the lower beam of the condenser assembly support sub-frame and said top front beam;
   the first and second arms are secured to and rearwardly extend from the side beams of the condenser assembly support sub-frame; and
   the front end of the reinforcing member is secured to said top front beam.

4. A transport refrigeration machine as defined by claims 2 or 3 wherein:
   the reinforcing member also extends rearward from the shaft support member; and
   a back end of the reinforcing member is secured to the evaporator assembly support sub-frame to further brace the shaft support member.

* * * * *